United States Patent [19]
Haghighi

[11] Patent Number: 6,044,440
[45] Date of Patent: Mar. 28, 2000

[54] SYSTEM AND METHOD TO PROVIDE HIGH GRAPHICS THROUGHPUT BY PIPELINING SEGMENTS OF A DATA STREAM THROUGH MULTIPLE CACHES

[75] Inventor: Siamack Haghighi, San Jose, Calif.

[73] Assignee: Intel Corporation, Santa Clara, Calif.

[21] Appl. No.: 08/891,184

[22] Filed: Jul. 10, 1997

[51] Int. Cl.[7] .................................................... G06F 13/00
[52] U.S. Cl. ............................ 711/140; 711/122; 711/135
[58] Field of Search ................................... 711/119, 127, 711/140, 143, 169, 122, 135

[56] References Cited

U.S. PATENT DOCUMENTS

| | | | |
|---|---|---|---|
| 5,416,739 | 5/1995 | Wong ........................................ | 711/140 |
| 5,821,940 | 10/1998 | Morgan et al. .......................... | 345/420 |
| 5,831,640 | 11/1998 | Wong et al. ............................. | 345/521 |
| 5,860,100 | 1/1999 | Feiste et al. ............................. | 711/135 |

OTHER PUBLICATIONS

Jouppi, N. P.; Improving direct–mapped cache performance by the addition of a small fully–associative cache and prefetch buffers; 17th Ann. Int. Symp. on Computer Architecture; May 1990; pp. 364–373.

Slater, Michael and Thorson, Mark; Local Buses Poised to Enter PC Mainstream; Microprocessor Report; Jul. 8, 1992; pp. 7–13.

Smith, Alan Jay; Sequential Program Prefetching in Memory Hierarchies; Computer; Dec. 1978; pp. 7–21.

*Primary Examiner*—David L. Robertson
*Attorney, Agent, or Firm*—Blakely, Sokoloff, Taylor & Zafman LLP

[57] ABSTRACT

A system and method of transferring data in multi-cache systems. The method includes transmitting a first segment of a data stream from a first cache to a second cache. The method also includes retransmitting the first segment of the data stream from the second cache to a main memory. The method further includes generating a second segment of the data stream and completing a transfer of the second segment to the first cache before completing the retransmission of the first segment from the second cache to the main memory.

19 Claims, 3 Drawing Sheets

SYSTEM AND METHOD TO PROVIDE HIGH GRAPHICS THROUGHPUT BY PIPELINING SEGMENTS OF A DATA STREAM THROUGH MULTIPLE CACHES

BACKGROUND OF THE INVENTION

1. Field of the Invention

The present invention relates to a method of transferring data between a processor and a multi-level cache to increase the amount of time in which the processor is operating without stall.

2. Description of Related Art

Rapid generation and processing of three dimensional (3-D) images are becoming increasingly important to many computer applications. Games and entertainment software use 3-D images to add realism to the game. Businesses have also discovered that the use of three dimensional graphics can increase the effectiveness of business presentations and data analysis.

Generating three dimensional images requires that a processor generate a stream of data. This stream of data is transferred to a memory for later use by a graphics unit. The transferring of data must occur at high speeds forming an almost continuous flow to avoid jerky images.

Typically, the process of generating 3-D images includes receiving user input, determining new characteristics and requirements, and translating these requirements into different drawing primitives and drawing operations. In one method of generating 3-D images, a processor in a system generates a tessellated object list. The tessellated object list may list triangle meshes or discrete triangles. Alternatively, this list may include higher order surface representations such as polygons, and bezier patches.

In order to further define or manipulate a 3-D image, the processor or graphics processor in a graphics unit uses the triangle list to calculate a new list of triangles based on a desired rotation or translation. A graphics unit may further refine the list of triangles to add necessary attributes such as lighting, texture and transparency. The output of a graphics processor typically consists of grouping of screen pixel information such as pixel color.

High performance 3-D graphics applications require the flow of data from the system processor to the graphics processor to be properly pipelined. In order to avoid "jerky" movement, the pipelining of data must supply a graphics processor with an approximately continuous flow or steady stream of data. In high speed processors the point at which the data flow is slowest acts as a bottleneck. This bottleneck dictates the peak level of performance of the 3-D imaging system. Thus, it is desirable to pipeline graphic data in the most efficient way possible.

Traditional cache systems do not pipeline data through the cache system. In a traditional system, the cache may be in a write back mode or a write through mode. In a write back mode, only the cache is updated, the contents of main memory are not updated until specifically instructed. In a write through mode, the main memory is always updated. In a multiple cache system, such updating is dependent. Thus when the processor alters the contents of a first cache, simultaneous updates of the first cache to main memory and from the first cache to a second cache are accomplished. Such systems are slow because the contents of the first cache can only be emptied as fast as the main memory can accept new data preventing the processor from soon writing to the first cache.

As will be disclosed, the invention is a novel method of using multiple caches to facilitate the pipelining of data.

SUMMARY OF THE INVENTION

An apparatus including a first cache in a write back mode which receives a first segment of a data stream from a processor. A second cache receives the first segment of data from the first cache upon receiving a special flush signal and forwards the first segment to a main memory while the processor generates a second segment of the data stream.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

The following invention describes a method of using multiple caches for improving the pipelining of data. In the following invention, a number of terms will be used which are herein defined. A cache as used in this invention is a special purpose storage, smaller and faster than main storage, usually used to hold a copy of instructions and data obtained from main storage and likely to be needed by the processor. The processor may be an embedded processor, a standalone microprocessor, a central processing unit in a computer or other processor types. An example of a traditional multiple level cache storage are the L1 and L2 caches of the PENTIUM® series including but not limited to the PENTIUM®, the PENTIUM® Pro™, the PENTIUM II™ and PENTIUM® with MMX microprocessors from Intel Corporation of Santa Clara, Calif. The cache may be integrated on a processor or alternately, the cache may be implemented as an external random access memory (RAM) coupled to the processor. Typically, a cache is implemented as static random access memory (SRAM) where the information is usually stored as a state of a memory element. A cache can be randomly accessible and includes tags indicating which lines are valid and which lines are invalid. For convenience, the pipelining of data in this application will be described in terms of a write operation which transfers data from the processor to the fastest cache and to subsequent slower caches and finally to a main memory. However, it is understood that for read operations, the direction of data flow will be reversed.

Figure 1:
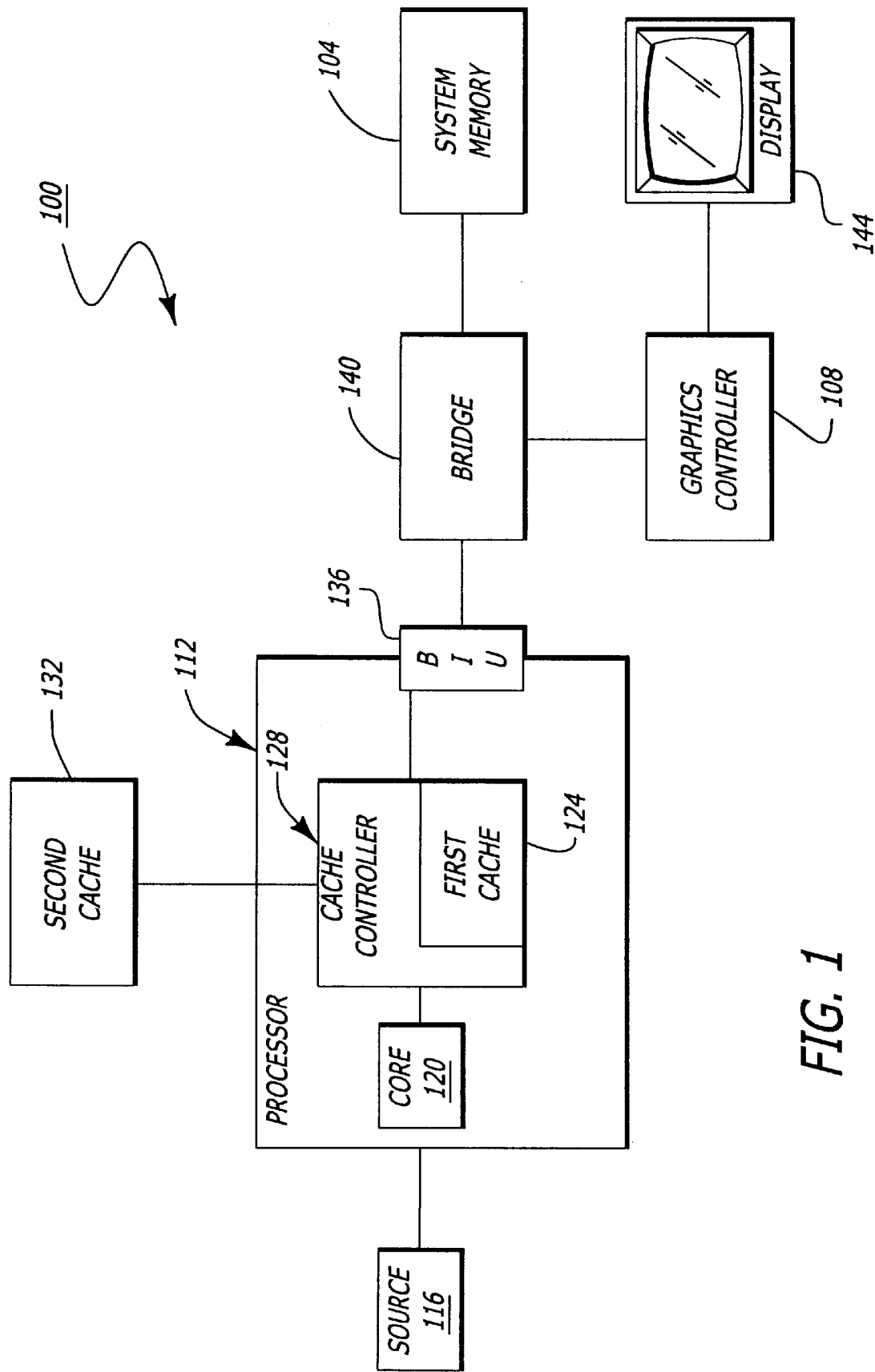
FIG. 1 shows a system for flowing data from a processor to system memory.

FIG. 1 illustrates a system 100 for flowing data to system memory 104 and a graphics controller 108 such as a graphics card. A processor 112 receives input from an external source 116. The external source 116 may also be a program which resides in system memory 104, in a first cache 124 or a second cache 132. In one embodiment the processor 112 includes a first cache 124 and a core 120 which contains processing circuitry. A cache controller 128 controls the operation of the first cache 124. In the PENTIUM® II series of microprocessor the first cache 124 is often called a L1 cache. In the PENTIUM® II microprocessor, the cache controller 128 coordinates the flow of data between the first cache 124 and a second cache 132. The second cache 132 may be incorporated into the processor 112 or may be an external second circuit coupled to the processor 112. In the PENTIUM® II type Processor, the second cache 132 is called an L2 cache.

In one embodiment of the present invention, data is output from the processor 112 through a bus interface unit 136. The bus interface unit 136 couples the processor 112 to external circuitry which may include circuitry such as a bridge 140 and system memory 104. In the embodiment shown, the bridge 140 also couples the system memory 104 to a graphics controller 108. The graphic card 108 processes incoming data and outputs an imaging signal to a display device 144. In an alternate embodiment, the second cache 132 may also be directly coupled to the bridge 140.

In one application of the processor of FIG. 1, input from a source 116 is used to generate a three-dimensional (3-D) image for display device 144. Producing such a 3-D image is computationally intensive. When three-dimensional graphics are created using the system shown in FIG. 1, data must be appropriately pipelined through the system 100 to prevent bottlenecks. One method of generating a 3-D graphic image using the system shown in FIG. 1 is shown in the flow chart of FIG. 2.

Figure 2:
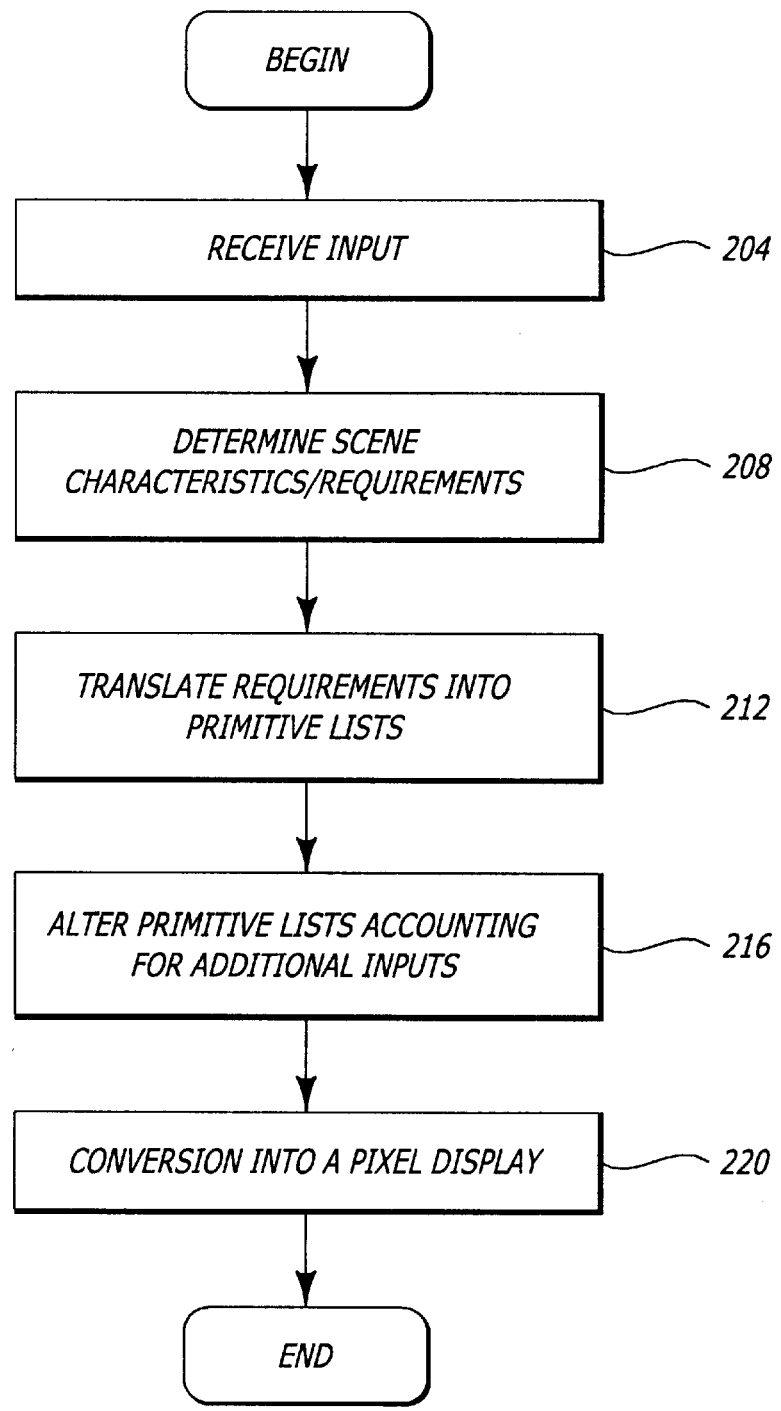
FIG. 2 shows a flow chart for processing graphical information.

FIG. 2 illustrates one method of using the apparatus shown in FIG. 1 to produce 3-D images. In block 204 the processor 112 receives input from an user or other external source 116. The processor determines scene characteristics or requirements based on the input in block 208. In block 212, the processor 112 translates the requirements into a series of primitives to be displayed or drawing operations. This list of primitives to be displayed or drawing operations is called a tessellated object list. A typical tessellated object list might list a series of triangle meshes or discrete triangles. The tessellated object list could also include higher order surface representations such as polygons and bezier patches. In block 216, additional received inputs are incorporated into the list. These inputs may include rotation, translation or viewing operations which result in additional triangles being added to the list.

In block 220, the tessellated list is converted into a screen representation. The screen representation may include pixel information for display by a display device. Typically the conversion into a pixel display includes rasterization which may be implemented on graphics controller 108. The display itself may be a monitor utilizing a cathode-ray tube, or a Liquid Crystal Display (LCD).

A series of interconnects connects the processor 112 which produces the tessellated object list and the graphics controller 108 which processes the tessellated object list. The series of interconnects includes memory units through which the data must be transferred in a pipeline fashion. The memory units allow the processor to output data in bursts faster than the system memory or graphics processor can accept new data. Thus, new data is pipelined through memories and interconnects. "Pipeline" is defined in this application to be a sequential series of data flow to simulate a continuous stream, such as a stream of data. The stream of data may be separated by short intervals, however the intervals are preferably of a constant periodic nature.

In order to use the cache as a pipeline system, the following rules will preferably be used to maintain cache coherency. During the transfer of a first segment of a stream of data from a first cache to a second cache, the first cache is valid and the second cache is invalid. After the transfer of the first segment of the stream of data is completed, the second cache is valid and the first cache is invalid. In an alternate embodiment, instead of transferring the entire contents of the cache, cache lines are individually transferred. During the individual transfer of a line, the particular line is valid in the first or transferring cache before and during transfer and invalid after transfer. After transfer, the corresponding line in the second or receiving cache becomes valid.

In the prior art, a typical system for flowing data transmits a segment of data from the core 120 to the first cache 124. The data is accumulated in the first cache 124 until the processor 112 receives a transfer signal to transfer the contents of the first cache into system memory 104. Typically the transfer instruction is a flush instruction. In the INTEL® PENTIUM® series of microprocessors, the flush instruction is a write back invalidate signal (WBINVD). Thus, in an INTEL® PENTIUM® series of processor, upon receipt of the WBINVD signal, the processor 112 transfers the contents of the first cache 124 which represents the first segment of a data stream to the system memory 104. During this transfer period, the processor is unable to process further information. The length of the transfer period is the length of time it takes to transfer the contents of the first cache 124 to the system memory 104; typically, this transfer period may be from 7,000 (7K) clock cycles to 10K clock cycles. When only the contents of a single cache line are being transferred, a typical transfer period is around 28 clocks. The processor 112 waits until this transfer period is completed before it continues generation of the next data stream segment.

In one embodiment of the invention, the transfer period is reduced and the amount of time available for processing is increased by using a second cache as an intermediate storage between the first cache and system memory. This may be accomplished by dynamically changing the write through or write back mode of the cache to a special write through mode or pipeline mode. In many prior art systems, the cache starts in a write-back or write-through mode. Allowing switching between the two modes facilitates use of the cache as a pipeline buffer. In the invention, the processor core 120 generates data and transmits it to a first cache 124. In one embodiment of the invention, a special flush signal is transmitted to the first cache causing the first cache to transfer its contents to a second cache 132, and from the second cache 132 to system memory. One method of implementing such a special flush signal is via a write back invalidate signal transmitted to the first cache which cause a transfer of the first cache contents to a second cache. Unlike prior art systems, only one write signal is needed to transfer the data from the first cache through intermediate caches to system memory. Thus, a time delay needed for multiple write signals to each cache in such a pipelined data flow is avoided. In an alternate embodiment, a pipeline move instruction may be implemented that results in a one line transfer directly from the first cache to the second cache and from the second cache to system memory without additional write signals. In a third embodiment of the present invention, the processor may be placed into a special mode such that when the first cache is full and in a write back mode, or when the first cache receives a standard flush signal while is in a write back mode, the valid contents of the first cache are automatically transferred to the second cache and the valid contents of the second cache transferred to system memory.

In a preferred embodiment, the second cache is much larger than the first cache. Typically, the first cache may contain 256 lines. Each line contains 32 bytes resulting in an eight Kilobyte (8 KB) first cache. The second cache typically contains 8K lines resulting in a 256 KB cache. The data from the second cache may be transferred through the bus interface unit 136, the bridge 140 to the system memory 104.

The transfer of the second cache memory to the system memory 104 or main memory is independent from the transfer of data from the first cache to the second cache and also independent of the input of data from the processor to the first cache. The term "independent" is defined to mean that transfer rates and transfer timing between a processor and cache and between the cache and a main memory are decoupled such that it is for example possible to transfer a second segment of a data stream from the processor to the first cache before completing a transfer of a first segment of the data stream from a second cache to main memory. Although the stated condition occurs in boundary conditions such as when both operations are to the same cache line in which case the second cache is transferred to main memory and the first cache is transferred to the second cache for data writes, the condition given is an example to emphasize the decoupling of the data transfers and is not meant to include such boundary conditions.

In prior art write through modes, data from the first cache is transferred from the first cache to system memory which prevents completion of the data transfer to the first cache until data transfer to the system memory is finished. In a prior art write back mode, data from the first cache is transferred to the second cache but there is no subsequent transfer to system memory. By pipelining data through the first and second cache to the system memory, the delays associated with the slower system memory can be avoided.

In one embodiment of the invention, the transfer from the second cache to system memory may occur under the control of a separate second cache controller. Thus, the transfer from the second cache to system memory does not require processor time. From the system memory, the information is input into a graphics controller 108. In alternate embodiments, the second cache 132 may be coupled to the bridge 140 and the data transferred from the first cache 124 to the second cache 132 without going through system memory 104. (For example, second level cache directly to graphics controller.)

Substantial speed savings are realized by transferring the data from the first cache to the second cache rather than from the first cache to system memory because typically the second cache is much faster than system memory. For example, a transfer of a line from the first cache to the second cache may typically be accomplished in 16 clock cycles. A similar transfer of a line from the first cache to main system memory may take twenty-eight (28) clocks. Using the illustrated example of a 256 line first cache, the contents of the first cache 124 can be transferred to the second cache 132 in approximately 4K clock cycles compared to 7K clock cycles for transferring the contents of the first cache to system memory. Because the processor is stopped during the transfer, transferring the contents of the first cache to the second cache stops the processor for 4K clock cycles as opposed to the 7K clock cycles during which the processor is stopped when transferring the contents of the first cache directly to system memory. As noted earlier, an independent cache controller controls information flow from the second cache to the system memory allowing the processor to operate while the contents of the second cache are transferred to system memory.

The described system can be extended to processor systems having three or more caches. In such a system, the data is pipelined from the fastest cache to the slowest cache and then to system memory. It is preferred that the slower caches are also the larger caches. By pipelining through multiple caches, it is possible to increase the percentage of time the processor is computing and minimize processor time spent transferring data. The increased percentage of time spent processing reduces the time needed to complete a given task.

Figure 3:
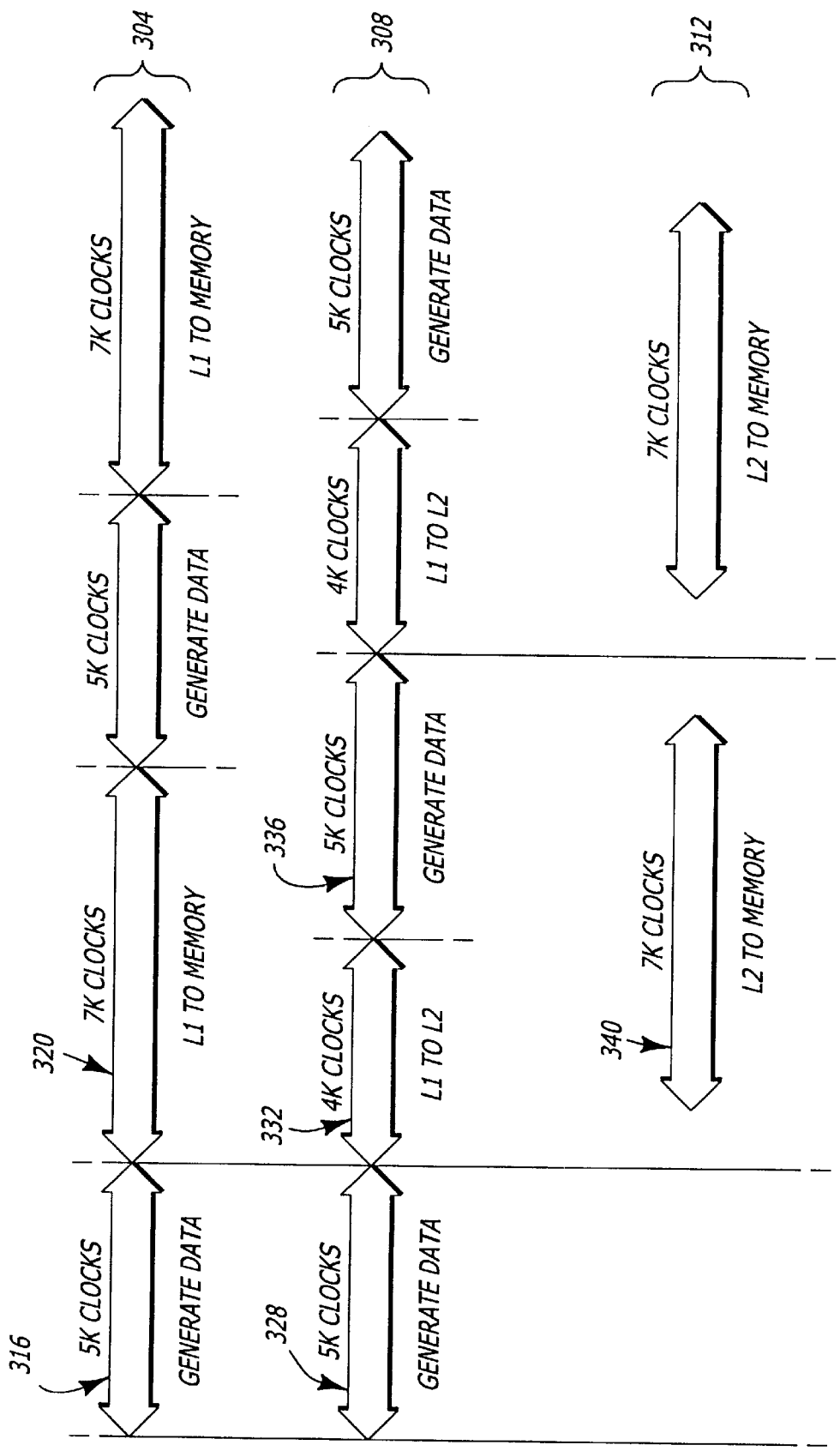
FIG. 3 shows a time chart illustrating the timing of the processor and a cache controller in one embodiment of the present invention.

FIG. 3 is a time chart illustrating how many clock cycles it takes for a typical processor to perform various operations. Row 304 illustrates processor activity during a prior art method of transferring data from the processor to the first cache and subsequently to system memory 104. Row 308 illustrates processor activity in particular the transfer of the first cache contents to the second cache, in one embodiment of the present invention. Row 312 shows a possible timing of transfers from the second cache to system memory 104. In the example illustrated in FIG. 3, a time of 5K clocks is used to generate a segment of a data stream before a flush instruction is executed. The time between flush instruction is approximately the time needed to fill the first cache with a segment of data.

Row 304 illustrates the prior art operation of a cache transfer from processor to system memory. During the first time period 316 of Row 304, the processor generates and transfers to the first cache a first segment of a data stream. One example of when such a data stream is generated is during 3-D graphics generation. During 3-D graphics generation, the first segment of data is typically a tessellated object list. During a second time period 320, the first segment of the data stream is transferred from the first cache to system memory. In the example illustrated in FIG. 3, this second time period 320 is about 7,000 clock cycles. During this second time period 320, the processor 112 cannot process new data and must wait until the first segment of data is completely transferred before it generates the next segment or second segment of data. The generation of the second segment of data occurs in a third time period 324.

One embodiment of the proposed invention is illustrated in rows 308 and 312. Row 308 illustrates the processor computations and the transfer of information from the first cache to the second cache. In row 308, a first segment of a data stream is generated and transferred to the first cache in time period 328. In the example shown, the time period 328 is approximately 5K clock cycles. During a second time period 332, the data is transferred from the first cache 124 to the second cache 132. The transfer from the first cache to the second cache takes substantially less time than transferring the contents of the first cache to system memory as was done in prior art. In the pictured embodiment, the transfer from first cache to second cache only takes 4K clock cycles, after which the processor can begin computing the next segment of the data stream during subsequent time period 336.

Row 312 illustrates periods when the cache controller 128 of FIG. 1 transfers data from the second cache 132 to system memory 104. The cache controller transfers the contents of the second cache 132 to system memory 104 during time period 340. This transfer typically takes about 7K clock cycles in the illustrated embodiment. The period of time is usually longer than the transfer of the contents from first cache to system memory. The second cache is typically larger than the first cache. In prior art systems, the speed with which data can be input into the main memory is typically the transfer rate bottleneck. In the time chart, simultaneous operation is illustrated by the overlap of time period 336 with the production of data in Row 308. As can be seen from rows 308 and 312 of the time chart, while the second cache 132 is transferring data to the system memory 104 the processor 112 may begin the generation of the next segment of data used to fill up the first cache 124 in time period 344.

The simultaneous operation of data generation 336 and transferring data 340 allows the processor to do processing for a greater percentage of a specific time period. Data is stored or pipelined through the system 100. The system 100 thereby goes into a mode which enables the use of the second cache as a high speed buffer. The speed or relative rate of transfer of processes in the invention may be expressed as:

$$\begin{array}{l}\text{time to generate}\\ \text{data segment and}\\ \text{input into a}\\ \text{first cache}\end{array} + \begin{array}{l}\text{the time to write}\\ \text{data segment to}\\ \text{the second cache}\end{array} < \begin{array}{l}\text{the time to write}\\ \text{the data segment}\\ \text{in the second}\\ \text{cache into system}\\ \text{memory}\end{array}$$

The preceding equation assumes that the process is to be continued indefinitely. More generally, the second cache is typically much larger than the first cache. Thus, the second cache can act as temporary storage for unsteady streaming or pipelining of data. Thus bursts may be accommodated, as long as the preceding expression is satisfied over an extended period of time.

$$\begin{array}{l}\text{the time to}\\ \text{generate a}\\ \text{section of data}\\ \text{and the time to}\\ \text{write to the}\\ \text{first cache}\end{array} + \begin{array}{l}\text{the time to}\\ \text{write the}\\ \text{section of}\\ \text{data to the}\\ \text{second cache}\end{array} \leq \begin{array}{l}\text{time to put}\\ \text{the section}\\ \text{of data from}\\ \text{the second}\\ \text{cache into}\\ \text{system memory}\end{array} \times \begin{array}{l}\text{the size of}\\ \text{the first}\\ \text{cache divided}\\ \text{by the size of}\\ \text{the second}\\ \text{cache.}\end{array}$$

While certain exemplary embodiments have been described and shown in the accompanying drawings, it is to be understood that such embodiments are merely illustrative of and not restrictive on the broad invention. In particular, it is noted that the described pipelining of data can be extended through many cache layers rather than the two and three cache systems described. Thus this invention should not be limited to the specific constructions and arrangements shown and described, since various other modifications may occur to those ordinarily skilled in the art but to the claims which follow.

What is claimed is:

1. An apparatus comprising:
   a first cache in a write back mode to receive a first segment of a data stream from a processor;
   a second cache to receive the first segment of the data stream from the first cache upon receiving a special flush signal; and
   a main memory to receive the first segment of data from the second cache while the processor independently generates a second segment of the data stream.

2. The apparatus of claim 1 wherein the main memory receives the first segment of the data stream while the processor outputs the second segment of the data stream to the first cache.

3. The apparatus of claim 1 further comprising a graphics controller coupled to the main memory to receive the first stream of data from the main memory.

4. The apparatus of claim 1 wherein the data stream includes information for controlling graphics.

5. The apparatus of claim 1 wherein the first cache is an internal cache on the processor and the second cache is an external cache.

6. The apparatus of claim 1 wherein the first cache memory is faster than the second cache memory, and wherein the second cache memory is faster than the main memory.

7. A method of streaming data comprising:
   transmitting a first segment of a data stream from a first cache to a second cache;
   retransmitting the first segment of the data stream from the second cache to a main memory; and
   generating a second segment of the data stream and completing a transfer of the second segment to the first cache before the retransmitting of the first segment from the second cache to the main memory is completed.

8. The method of claim 7 further comprising:
   transmitting the second segment of the data stream from the first cache to the second cache while the retransmitting is taking place.

9. The method of claim 7 further comprising:
   outputting the first stream of data to a graphics controller to generate graphic data for a display device.

10. The method of claim 7 wherein the generating of the second segment of data includes creating a tessellated object list from a user input.

11. The method of claim 9 further comprising:
    rasterizing and displaying the graphics data.

12. A method of pipelining data comprising:
    transmitting a first segment of a data stream from a first cache to a second cache;
    retransmitting the first segment of the data stream from a second cache to a third cache, the retransmitting occurring independently of the transmitting step; and
    generating a second segment of the data stream during the retransmitting step.

13. The method of claim 12 further comprising:
    retransmitting the first segment of the data from the third cache to a fourth cache.

14. A method of generating graphics comprising:
    receiving user input;
    determining requirements which correspond to the user input;
    translating the requirements into object displacements and generating a tessellated object list;
    outputting a first section of the tessellated object list to a first cache; and
    pipelining the tessellated object list from the first cache through a second cache to a main memory.

15. The method of claim 14 further comprising:
    transferring the first section of the tessellated object list from main memory to a graphics controller.

16. The method of claim 14 further comprising:
    transmitting the output of the graphics controller to a display device to rasterize and display an image corresponding to the user input.

17. A means for transferring data comprising:
    a transmitting means for transmitting a first segment of a data stream from a first cache to a second cache;

a controlling means for retransmitting the first segment of the data stream from the second cache to a main memory; and a means for generating a second segment of the data stream while the controlling means retransmits the first segment of the data stream from the second cache to the main memory.

18. An apparatus comprising:

a main memory to store a stream of data;

a second cache to receive a first segment of the data stream from main memory;

a first cache to receive the first segment of the data stream from the second cache; and a processor to receive the first segment of the data stream from the first cache while the second cache independently retrieves a second segment of the data stream from the main memory.

19. An apparatus comprising:

a first cache in a write back mode to receive a first line of a data stream from a processor;

a second cache to receive the first line of the data stream from the first cache upon receiving a special move signal; and a main memory to receive the first line of data from the second cache.

* * * * *